(12) United States Patent
Won et al.

(10) Patent No.: US 9,120,973 B2
(45) Date of Patent: Sep. 1, 2015

(54) FLUORESCENT SUBSTANCE AND A PRODUCTION METHOD THEREFOR

(75) Inventors: Hyong Sik Won, Suwon-si (KR); Seong Min Kim, Cheonan-si (KR); Chan Suk Min, Suwon-si (KR); Chul Soo Yoon, Suwon-si (KR)

(73) Assignee: SAMSUNG ELECTRONICS CO., LTD., Suwon Si (KR)

(*) Notice: Subject to any disclaimer, the term of this patent is extended or adjusted under 35 U.S.C. 154(b) by 87 days.

(21) Appl. No.: 13/985,398

(22) PCT Filed: Feb. 6, 2012

(86) PCT No.: PCT/KR2012/000844
§ 371 (c)(1),
(2), (4) Date: Oct. 25, 2013

(87) PCT Pub. No.: WO2012/111929
PCT Pub. Date: Aug. 23, 2012

(65) Prior Publication Data
US 2014/0048742 A1 Feb. 20, 2014

(30) Foreign Application Priority Data
Feb. 14, 2011 (KR) .......................... 10-2011-0012712

(51) Int. Cl.
C09K 11/08 (2006.01)
C09K 11/66 (2006.01)
C09K 11/77 (2006.01)

(52) U.S. Cl.
CPC ......... C09K 11/7728 (2013.01); C09K 11/0883 (2013.01); C09K 11/7734 (2013.01)

(58) Field of Classification Search
CPC ........... C09K 11/7734; C09K 11/7706; C09K 11/7749; C09K 11/7758; C09K 11/7774; C09K 11/7792
USPC .................................................. 252/301.4 F
See application file for complete search history.

(56) References Cited

U.S. PATENT DOCUMENTS

2003/0030038 A1  2/2003 Mitomo et al.
2004/0155225 A1  8/2004 Yamada et al.
(Continued)

FOREIGN PATENT DOCUMENTS

CN   1839191 A   9/2006
CN   101044223 A  9/2007
(Continued)

OTHER PUBLICATIONS

Xie. Crystal and electronic structures, luminescence properties of Eu2+—doped Si6—zAlzOzN8—z and MySi6—zAlz—yOz+yN8—z—y (M=2Li, Mg, Ca, Sr, Ba).Journal of Solid State Chemistry vol. 181, Issue 12, Dec. 2008, pp. 3200-3210.*
(Continued)

*Primary Examiner* — Matthew E Hoban
(74) *Attorney, Agent, or Firm* — Sughrue Mion, PLLC

(57) ABSTRACT

The fluorescent substance according to one embodiment of the present invention has the following compositional formula (1): [Compositional formula 1] $Sr_ySi_{(6-z)}Al_zO_zN_{(8-z)}$:$Re_x$. Here, x, y and z are respectively $0.005 \leq x \leq 0.05$, $0.05 \leq y \leq 0.5$, $0.001 \leq z \leq 0.50$, and Re is a rare earth element. As a result, the fluorescent substance according to one embodiment of the present invention can exhibit a short wavelength of between 525 nm and 537 nm when the concentration of strontium is between 0.05 moles and 0.5 moles. Also, the fluorescent substance can exhibit a short wavelength of between 525 nm and 537 nm by the addition of barium in a range of between 0.003 moles and 0.125 moles when the concentration of aluminium is high. Also, the fluorescent substance can exhibit a short wavelength of between 525 nm and 537 nm by adjusting the oxygen concentration by the addition not only of AlN but also of $Al_2O_3$ as an aluminium precursor when the concentration of aluminium is high. Ultimately, since the fluorescent substance according to one embodiment of the present invention can exhibit a short wavelength of between 525 nm and 537 nm, it is possible to prevent dropoff in colour reproduction and the colour rendering index.

21 Claims, 3 Drawing Sheets

(56) References Cited

U.S. PATENT DOCUMENTS

| | | |
|---|---|---|
| 2007/0108896 A1 | 5/2007 | Hirosaki |
| 2008/0001126 A1 | 1/2008 | Hirosaki |
| 2008/0231166 A1 | 9/2008 | Su |
| 2008/0259431 A1 | 10/2008 | Weichmann et al. |
| 2010/0053932 A1 | 3/2010 | Emoto et al. |
| 2010/0164367 A1 | 7/2010 | Shioi et al. |
| 2010/0200874 A1 | 8/2010 | Shioi et al. |
| 2010/0213820 A1 | 8/2010 | Sakai et al. |
| 2011/0096560 A1 | 4/2011 | Ryu et al. |
| 2012/0306356 A1 | 12/2012 | Yoon et al. |

FOREIGN PATENT DOCUMENTS

| | | |
|---|---|---|
| CN | 101278232 A | 10/2008 |
| CN | 101600778 A | 12/2009 |
| CN | 102844405 A | 12/2012 |
| EP | 0 155 047 A1 | 9/1985 |
| JP | 60-206889 A | 10/1985 |
| JP | 2002-363554 A | 12/2002 |
| JP | 2003-336059 A | 11/2003 |
| JP | 2004-238505 A | 8/2004 |
| JP | 2005-255895 A | 9/2005 |
| JP | 2007-31201 A | 2/2007 |
| JP | 2009-286995 A | 12/2009 |
| KR | 10-2007-0053323 A | 5/2007 |
| KR | 10-2010-0009577 A | 1/2010 |
| KR | 10-2010-0120616 A | 11/2010 |
| KR | 10-2011-0007482 A | 1/2011 |
| WO | 2006/033417 A1 | 3/2006 |

OTHER PUBLICATIONS

International Search Report (PCT/ISA/210) dated Aug. 27, 2012, issued in International Application No. PCT/KR2012/000844.

Ryu, Jeong Ho et al., "Luminescence properties of $Eu^{2+}$—doped $\beta$—$Si_{6-z}Al_zO_zN_{8-z}$ microcrystals fabricated by gas pressure reaction", Journal of Crystal Growth, vol. 311 No. 3, Sep. 30, 2008, pp. 878-882.

Communication dated Jun. 20, 2014 issued by the State Intellectual Property Office of P.R. China in counterpart Chinese Application No. 201280018413.1.

J.W.H. van Krevel, "On new rare-earth doped M—Si—Al—O—N materials", Luminescence properties and oxidation resistance, 1998, 176 pgs. total.

Communication dated Oct. 23, 2012 issued by the Korean Intellectual Property Office in counterpart Korean Patent Application No. 10-2011-0012712.

Sialon, "Proceedings of First China Maritime", colleges Postgraduate column, editorial board, Dalian Maritime University press, p. 528-531, 2009.

Xu xurong, et al., "Luminescence and Luminescent Materials", Science press, p. 597-602, 2004.

Communication dated Mar. 9, 2015 issued by the State Intellectual Property Office in counterpart Application No. 201280018413.1.

* cited by examiner

FLUORESCENT SUBSTANCE AND A PRODUCTION METHOD THEREFOR

TECHNICAL FIELD

The present invention relates to a phosphor and a method of preparing the same. More particularly, the present invention relates to a short-wavelength SiAlON phosphor to prevent a decrease in color reproducibility and color rendering index and a method of preparing the same.

BACKGROUND ART

A phosphor is used for a vacuum fluorescent display (VFD), a field emission display (FED), a plasma display panel (PDP), a light emitting device (LED), or the like. To make a phosphor emit light, energy for rendering the phosphor excited is supplied to the phosphor, and the phosphor is excited by an excitation source having high energy, for example, vacuum ultraviolet rays, ultraviolet rays, electron beams, and blue light.

However, since the phosphor is deformed by these excitation sources and thus tends to involve a decrease in luminance and to deteriorate, a phosphor having less luminance degradation is required. Accordingly, SiAlON phosphors, which show a slow decay in luminance, are introduced instead of silicate phosphors, phosphate phosphors, aluminate phosphors, and sulfide phosphors, conventionally used.

A SiAlON phosphor is a kind of acid nitrides having Si, Al, O, and N and includes an α-SiAlON phosphor and a β-SiAlON phosphor which have different crystal structures. Non-patent Literature 1 discloses an α-SiAlON phosphor, while Patent Documents 1, 2, 3, and 4 disclose an α-SiAlON phosphor and a light emitting device using the same.

Also, Patent Document 5 discloses a β-SiAlON phosphor, while Patent Document 6 discloses a β-SiAlON phosphor and a light emitting device using the same.

[Non-patent Literature 1] J. W. H. vankrebel "On new rare earth doped M-Si—Al—O—N materials," Tu Eindhoven The Netherland, P145-161 (1998)
[Patent Document 1] JP Patent Publication No. 2002-363554
[Patent Document 2] JP Patent Publication No. 2003-336059
[Patent Document 3] JP Patent Publication No. 2004-238505
[Patent Document 4] JP Patent Publication No. 2007-31201
[Patent Document 5] JP Patent Publication No. S60-206889
[Patent Document 6] JP Patent Publication No. 2005-255895

α-SiAlON is a crystal structure having a unit structure represented by $Si_{12-(m+n)}Al_{(m+n)}O_nN_{8-n}$, in which two empty spheres are present. Metal ions having a relatively small radius, for example, $Ca^{2+}$, may be engaged in the empty spheres of the crystal structure, and α-SiAlON engaging the metal ions may be represented by a general formula $M_{m/v}Si_{12-(m+n)}Al_{(m+n)}O_nN_{8-n}$:Eu, wherein M is a metal ion and V is a valence thereof.

As stated in Non-patent Literature 1 and Patent Document 1, α-SiAlON engaging Ca and an activator, Eu is known as a phosphor emitting light in a yellow region. Since this phosphor has a continuous excitation band from an ultraviolet region to a blue region and thus emits yellow light by irritation of ultraviolet rays or blue light, the phosphor may be used as a yellow phosphor for a white light emitting device.

This phosphor may be prepared by mixing proper amounts of precursor materials obtained from powders of silicon nitride, aluminum nitride, calcium carbonate ($CaCO_3$), and europium oxide as starting materials and sintering the mixture at a high temperature under a nitrogen atmosphere. Further, a substrate of a high-purity material with a limited amount of impurities disclosed in Patent Document 3 or metal silicone disclosed in Patent Document 4 are used so as to achieve high luminance.

Meanwhile, β-SiAlON is represented by a general formula $Si_{6-x}Al_xO_xN_{6-x}$. Patent Documents 5 and 6 disclose a β-SiAlON phosphor prepared by adding an activator to β-SiAlON. Patent Document 5 discloses a β-SiAlON phosphor obtained using β-SiAlON and an activator, for example, Cu, Ag, or a rare-earth element such as Eu.

However, it is reported that a Eu-activated β-SiAlON phosphor of Patent Document 5 emits light in a blue wavelength region from 410 nm to 440 nm, while a phosphor disclosed in Patent Document 6 is a green phosphor. Difference in emission color between the phosphors is probably due to a fact, as mentioned in Patent Document 6, that the activator Eu is not securely engaged in β-SiAlON since the Eu-activated β-SiAlON of Patent Document 5 has a low sintering temperature.

A Eu-activated β-SiAlON phosphor of Patent Document 6 emits green light and is excited by light in a blue wavelength region. Thus, the Eu-activated β-SiAlON phosphor attracts attention as a green light emitting phosphor for a white light emitting device, which is constituted by a blue light emitting device and a phosphor or by an ultraviolet light emitting device and a phosphor.

In particular, the Eu-activated β-SiAlON phosphor has a narrow spectrum width of about 55 nm and good color purity and thus is expected to be used as a green phosphor for a white light emitting device requiring color reproducibility.

A β-SiAlON phosphor is also prepared by mixing proper amounts of materials obtained from powders of silicon nitride, aluminum nitride, and an activator as starting materials and sintering the mixture at a high temperature under a nitrogen atmosphere.

That is, in a conventional method of synthesizing a rare-earth element added β-SiAlON phosphor, raw materials including oxides and nitrides, such as $Si_3N_4$, $SiO_2$, AlN, $Al_2O_3$, and $Eu_2O_3$, are mixed, and synthesized at 1,900° C. or higher under a nitrogen atmosphere.

However, when β-SiAlON is synthesized by mixing a rare-earth element used as a bivalent cation activator in mixing the raw materials, other cations than Si and Al, which form SiAlON, may serve as impurities, degrading crystallinity of β-SiAlON, which may cause a decrease in luminance of the phosphor.

Further, as described above, although a yellow YAG phosphor is applied to a light emitting device to realize a white light emitting device for the first time, the white light emitting device shows a low color rendering index (CRI) as compared with a common lamp. Thus, a white light emitting device having an improved CRI by using green and red phosphors has been recently developed. As a green phosphor applied to the device, a silicate phosphor or a sulfide phosphor is used. However, such phosphors exhibit low high-temperature, thermal, and chemical stabilities, and thus a phosphor using nitrides is vigorously studied.

Since a nitride phosphor is obtained by adding an activator to a host material, such as $Si_3N_4$ and SiAlON used for a high-temperature structure materials, the phosphor has superior color reproducibility and reliability for display and excellent high-temperature light emitting characteristics and thus is applied to a TV backlight and a lighting lamp.

In addition, although a β-SiAlON phosphor has high efficiency in around 540 nm, a 540 nm wavelength is a long wavelength among green color line in a CIE chromaticity diagram, which may cause a decrease in color reproducibility

DISCLOSURE

Technical Problem and CRI of a light source. Accordingly, a SiAlON phosphor which emits light at a shorter wavelength than 540 nm is increasingly needed.

An aspect of the present invention provides a short-wavelength SiAlON phosphor to prevent a decrease in color reproducibility and color rendering index (CRI) and a method of preparing the same.

Technical Solution

According to an aspect of the present invention, there is provided a phosphor being represented by Formula 1:

$$Sr_y Si_{(6-z)} Al_z O_z N_{(8-z)} : Re_x, \quad \text{[Formula 1]}$$

where $0.005 \leq x \leq 0.05$, $0.05 \leq y \leq 0.5$, $0.001 \leq z \leq 0.50$, and Re is a rare-earth element.

z may be 0.10 to 0.35.

The phosphor may have a peak emission wavelength of 525 nm to 537 nm when irradiated by an excitation source.

The rare-earth element may be selected from the group consisting of Eu and Ce.

According to another exemplary embodiment, there is provided a phosphor being represented by Formula 2:

$$Sr_y Ba_m Si_{(6-z)} Al_z O_z N_{(8-z)} : Re_x, \quad \text{[Formula 2]}$$

where $0.005 \leq x \leq 0.05$, $0.05 \leq y \leq 0.5$, $0.50 \leq z \leq 1.0$, $0.003 \leq m \leq 0.125$, and Re is a rare-earth element.

m may satisfy $0.01 \leq m \leq 0.125$.

The phosphor may have a peak emission wavelength of 525 nm to 537 nm when irradiated by an excitation source.

According to still another exemplary embodiment, there is provided a phosphor being represented by Formula 3:

$$Sr_y Si_{(6-z)} Al_z O_z N_{(8-z)} : Re_x, \quad \text{[Formula 3]}$$

where $0.005 \leq x \leq 0.05$, $0.05 \leq y \leq 0.5$, $0.50 \leq z \leq 1.0$, and Re is a rare-earth element.

z may satisfy $0.58 \leq z \leq 0.75$.

The phosphor may have a peak emission wavelength of 525 nm to 537 nm when irradiated by an excitation source.

According to an aspect of the present invention, there is provided a method of preparing a phosphor, the method including generating a mixture by mixing a strontium precursor, a silicon precursor, an aluminum precursor, and an activator precursor, and sintering the mixture under a nitrogen atmosphere, the phosphor being represented by Formula 1:

$$Sr_y Si_{(6-z)} Al_z O_z N_{(8-z)} : Re_x, \quad \text{[Formula 1]}$$

where $0.005 \leq x \leq 0.05$, $0.05 \leq y \leq 0.5$, $0.001 \leq z \leq 0.50$, and Re is a rare-earth element.

The strontium precursor may be $SrCO_3$.

The aluminum precursor may be selected from the group consisting of metallic aluminum and aluminum nitride.

The activator precursor may be a compound including a rare-earth element.

The rare-earth element may be selected from the group consisting of Eu and Ce.

The sintering may be carried out at 1,800° C. to 2,200° C.

The sintering may be carried out at a pressure of nitrogen gas of 0.1 MPa to 10 MPa.

According to another aspect of the present invention, there is provided a method of preparing a phosphor, the method including generating a mixture by mixing a strontium precursor, a barium precursor, a silicon precursor, an aluminum precursor, and an activator precursor, and sintering the mixture under a nitrogen atmosphere, the phosphor being represented by Formula 2:

$$Sr_y Ba_m Si_{(6-z)} Al_z O_z N_{(8-z)} : Re_x, \quad \text{[Formula 2]}$$

where $0.005 \leq x \leq 0.05$, $0.05 \leq y \leq 0.5$, $0.50 \leq z \leq 1.0$, $0.003 \leq m \leq 0.125$, and Re is a rare-earth element.

The barium precursor may be $BaCO_3$.

According to still another aspect of the present invention, there is provided a method of preparing a phosphor, the method including generating a mixture by mixing a strontium precursor, a silicon precursor, an aluminum precursor, and an activator precursor, and sintering the mixture under a nitrogen atmosphere, the phosphor being represented by Formula 3:

$$Sr_y Si_{(6-z)} Al_z O_z N_{(8-z)} : Re_x, \quad \text{[Formula 3]}$$

where $0.005 \leq x \leq 0.05$, $0.05 \leq y \leq 0.5$, $0.50 \leq z \leq 1.0$, and Re is a rare-earth element.

The aluminum precursor may be aluminum nitride and aluminum oxide.

Advantageous Effects

According to an exemplary embodiment of the present invention, a phosphor is represented by Formula 1:

$$Sr_y Si_{(6-z)} Al_z O_z N_{(8-z)} : Re_x, \quad \text{[Formula 1]}$$

where $0.005 \leq x \leq 0.05$, $0.05 \leq y \leq 0.5$, $0.001 \leq z \leq 0.50$, and Re is a rare-earth element.

Thus, when strontium concentration in the phosphor according to the exemplary embodiment is 0.05 to 0.5 mol, the phosphor may emit light at a short wavelength ranging from 525 nm to 537 nm.

Further, when aluminum concentration in the phosphor is high, the phosphor may emit light at a short wavelength ranging from 525 nm to 537 nm by adding 0.003 to 0.125 mol of barium. Also, when the aluminum concentration is high, the phosphor may emit light at a short wavelength ranging from 525 nm to 537 nm by adjusting oxygen concentration via addition of not only AlN but also $Al_2O_3$ as an aluminum precursor.

Ultimately, the phosphor according to the exemplary embodiment may emit light at a short wavelength ranging from 525 nm to 537 nm, thereby preventing a decrease in color reproducibility and CRI.

MODE FOR INVENTION

Figure 1:
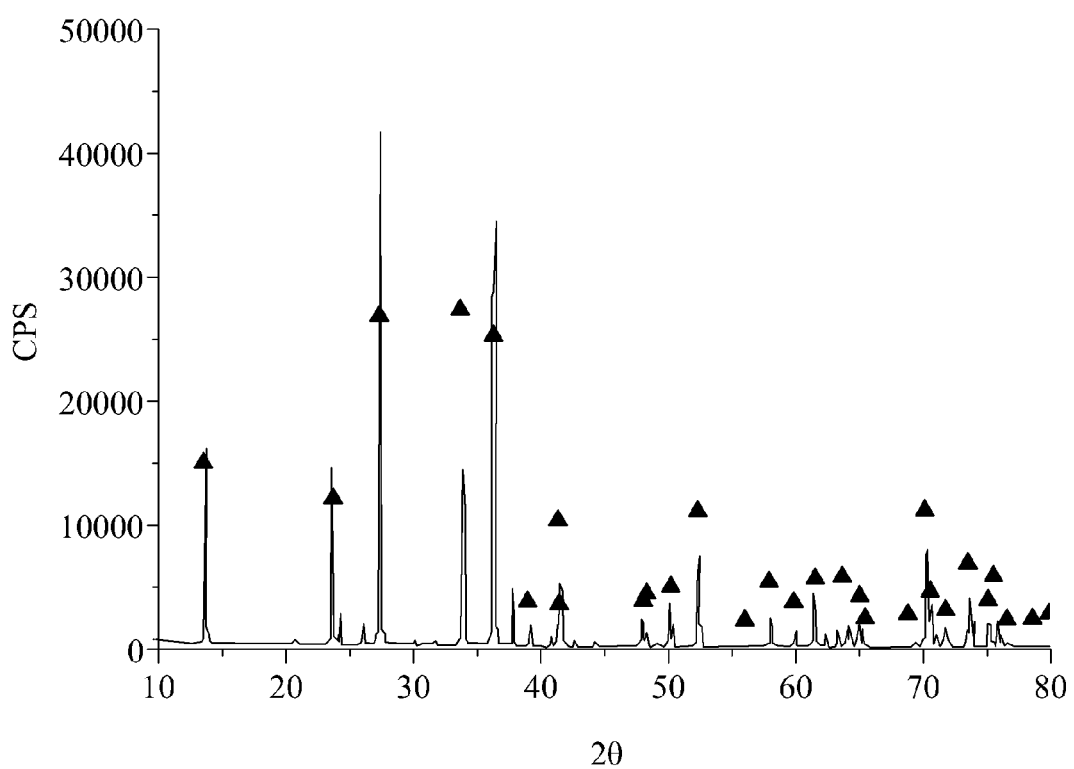
FIG. 1 is a graph illustrating x-ray diffraction (XRD) of a SiAlON phosphor according to Example 1.

Hereinafter, phosphors and methods for preparing the same according to exemplary embodiments of the present invention will be described with reference to the accompanying drawings. The phosphors according to the exemplary embodiments are a β-SiAlON phosphor, which may be referred to as various terms in the specification, for example, a phosphor and a SiAlON phosphor.

A phosphor according to an exemplary embodiment of the present invention is represented by Formula 1:

$$Sr_y Si_{(6-z)} Al_z O_z N_{(8-z)}:Re_x, \quad \text{[Formula 1]}$$

where $0.005 \le x \le 0.05$, $0.05 \le y \le 0.5$, $0.001 \le z \le 0.50$, and Re is a rare-earth element.

The phosphor may be obtained by adding strontium (Sr) to a β-SiAlON phosphor, thereby exhibiting a peak emission wavelength of 540 nm or lower. That is, strontium is added to the β-SiAlON phosphor, thereby synthesizing a shorter-wavelength phosphor than the β-SiAlON phosphor. Strontium may be added in an amount of 0.05 mol to 0.5 mol in Formula 1, $Sr_y Si_{(6-z)} AlO_z N_{(8-z)}:Re_x$.

In the SiAlON phosphor including strontium according to the present embodiment, strontium does not substitute silicon or aluminum forming a host matrix but is added as a dopant to an empty sphere of a crystal structure. Ultimately, in the present embodiment, addition of strontium neither deforms nor affects the crystal structure of the host matrix. Also, strontium contributes to phase stabilization of the SiAlON phosphor, thereby improving reliability, enhancing light emitting efficiency, and shortening a wavelength of light.

In Formula 1, $Sr_y Si_{(6-z)} Al_z O_z N_{(8-z)}:Re_x$, z is preferably 0.001 mol to 0.50 mol, more preferably 0.10 mol to 0.35 mol. The synthesized phosphor may emit light at a short wavelength ranging from 525 nm to 537 nm, thereby preventing a decrease in color reproducibility and CRI.

In the SiAlON phosphor according to the present embodiment, the rare-earth element may be selected from the group consisting of Eu and Ce. Eu may be derived from europium oxide ($Eu_2O_3$) as a EU containing compound, while Si may be derived from silicon oxide ($SiO_2$) or silicon nitride ($Si_3N_4$) as a Si containing compound. Further, Al may be derived from aluminum nitride (AlN) or aluminum oxide ($Al_2O_3$) as an Al containing compound.

A phosphor according to another exemplary embodiment of the present invention is represented by Formula 2:

$$Sr_y Ba_m Si_{(6-z)} Al_z O_z N_{(8-z)}:Re_x, \quad \text{[Formula 2]}$$

where $0.005 \le x \le 0.05$, $0.05 \le y \le 0.5$, $0.50 \le z \le 1.0$, $0.003 \le m \le 0.125$, and Re is a rare-earth element.

In the present embodiment, when aluminum concentration is high, for example, 0.50 mol to 1.0 mol, addition of strontium and barium enables the SiAlON phosphor to emit light at a short wavelength. Barium concentration is 0.003 mol to 0.125 mol, preferably 0.01 mol to 0.125 mol.

In the SiAlON phosphor including barium according to the present embodiment, barium does not substitute silicon or aluminum forming a host matrix but is added as a dopant to an empty sphere of a crystal structure in the same manner as strontium. Ultimately, barium never affects the crystal structure of the host matrix and enables the SiAlON phosphor to exhibit a short peak emission wavelength ranging from 525 nm to 537 nm.

Thus, the SiAlON phosphor with a high aluminum concentration may also emit light at a short wavelength ranging from 525 nm to 537 nm by adding not only strontium but barium, thereby preventing a decrease in color reproducibility and CRI.

A phosphor according to still another exemplary embodiment of the present invention is represented by Formula 3:

$$Sr_y Si_{(6-z)} Al_z O_z N_{(8-z)}:Re_x, \quad \text{[Formula 3]}$$

where $0.005 \le x \le 0.05$, $0.05 \le y \le 0.5$, $0.50 \le z \le 1.0$, and Re is a rare-earth element.

In the present embodiment, when aluminum concentration is high, for example, 0.50 mol to 1.0 mol, addition of not only AlN but also $Al_2O_3$ as an aluminum precursor enables the SiAlON phosphor to emit light at a short wavelength. That is, the phosphor may emit light at a short peak emission wavelength ranging from 525 nm to 537 nm by adjusting oxygen concentration via addition of AlN and $Al_2O_3$ as an aluminum precursor. In the phosphor of the present embodiment, aluminum and oxygen concentrations may be 0.58 mol to 0.75 mol.

Thus, the SiAlON phosphor with a high aluminum concentration may also emit light at a short wavelength ranging from 525 nm to 537 nm by adjusting oxygen concentration, thereby preventing a decrease in color reproducibility and CRI.

Hereinafter, a method of preparing a SiAlON phosphor according to an exemplary embodiment of the present invention will be described.

The method of preparing the SiAlON phosphor according to the present embodiment includes generating a mixture by mixing a strontium precursor, a silicon precursor, an aluminum precursor, and an activator precursor, and sintering the mixture under a nitrogen atmosphere.

A SiAlON phosphor prepared by the method of preparing the SiAlON phosphor according to the present embodiment is represented by Formula 1:

$$Sr_y Si_{(6-z)} Al_z O_z N_{(8-z)}:Re_x, \quad \text{[Formula 1]}$$

where $0.005 \le x \le 0.05$, $0.05 \le y \le 0.5$, $0.001 \le z \le 0.50$, and Re is a rare-earth element.

In the present embodiment, a shorter-wavelength phosphor than the β-SiAlON phosphor may be synthesized by adding strontium to the β-SiAlON phosphor. Strontium may be added in an amount of 0.05 mol to 0.5 mol in Formula 1, $Sr_y Si_{(6-z)} Al_z O_z N_{(8-z)}:Re_x$.

In Formula 1, $Sr_y Si_{(6-z)} Al_z O_z N_{(8-z)}:Re_x$, z is preferably 0.001 mol to 0.50 mol, more preferably 0.10 mol to 0.35 mol. The synthesized phosphor may emit light at a short wavelength ranging from 525 nm to 537 nm, thereby preventing a decrease in color reproducibility and CRI.

The strontium precursor may include metallic strontium or a strontium compound. The strontium precursor may be $SrCO_3$.

The silicon precursor may include metallic silicon or a silicon compound. As the silicon precursor, metallic silicon may be used alone or in combination with a silicon compound. The silicon compound may be silicon nitride.

The metallic silicon is preferably high-purity powdery metallic silicon with a low content of impurities, such as Fe. A particle diameter or distribution of metallic silicon powder does not have a direct impact on a particle system of the phosphor.

However, depending on sintering conditions or mixed raw materials, the particle diameter or distribution of the silicon powder exerts an impact not only on characteristics of the phosphor regarding particle size, such as a particle diameter or shape, but also on light emitting properties of the phosphor, and thus the metallic silicon powder preferably has a particle diameter of 300 μm or less.

Since the metallic silicon shows a higher reactivity with a smaller particle diameter, the metallic silicon preferably has smaller particles in view of reactivity. However, reactivity is also dependent on mixed raw materials or a sintering rate, and thus the metallic silicon does not necessarily have a small particle diameter and is not limited to a powder form.

The aluminum precursor may include metallic aluminum or an aluminum compound. As the aluminum precursor, metallic aluminum may be used alone or in combination with an aluminum compound. The aluminum compound may be aluminum nitride.

When the silicon precursor is metallic silicon, the aluminum precursor may not necessarily be metallic aluminum but may be an aluminum compound alone.

When the metallic aluminum is used, high-purity powdery metallic aluminum with a low content of impurities, such as Fe, is preferable. As mentioned above, the metallic aluminum also preferably has a particle diameter of 300 μm or less.

However, since reactivity is also dependent on mixed raw materials or a sintering rate, the metallic aluminum does not necessarily have a small particle diameter and is not limited to a powder form.

The rare-earth element as an activator may be selected from the group consisting of Eu, Ce, Pr, Nd, Sm, Gd, Tb, Dy, Ho, Er, Tm, and Yb. Preferably, the rare-earth element is Eu or Ce. The activator precursor may include oxides, such as $Eu_2O_3$, $Sm_2O_3$, $Yb_2O_3$, CeO, $Pr_7O_{11}$ and $Tb_3O_4$, $Eu(NO_3)_3$, EuN, or $EuCl_3$.

As described above, the strontium precursor, the silicon precursor, the aluminum precursor, and the activator precursor are measured and mixed into a mixture. Subsequently, the first mixture is sintered under a nitrogen atmosphere, thereby preparing a SiAlON phosphor.

In detail, the mixture including the strontium precursor, the silicon precursor, the aluminum precursor, and the activator precursor is sintered at 1,800 to 2,200° C. and a pressure of nitrogen gas of 0.1 to 10 MPa. Sintering may be carried out by tamping the sorted mixture powder in a boron nitride (BN) crucible.

Here, the nitrogen containing atmosphere preferably has an $N_2$ gas concentration of 90% or higher. The nitrogen atmosphere may be formed by creating a vacuum state and then introducing a nitrogen containing gas. Alternatively, the nitrogen atmosphere may be formed by introducing a nitrogen containing gas without creation of a vacuum state, in which introduction of the gas may be discontinuously conducted.

The method of preparing the SiAlON phosphor according to the present embodiment may further include heat-treating of the sintered phosphor in a reducing atmosphere in order to accelerate reduction of europium oxide ($Eu_2O_3$). In the reducing atmosphere, a mixture of an $N_2$ gas with $H_2$, CO, or $NH_3$ may be used, wherein concentration of $H_2$, CO, or $NH_3$ added to the $N_2$ gas may be 0.1 to 10%. Heat treatment in the reducing atmosphere may be carried out at 1,000 to 1,700° C. for about 1 to 20 hours.

The method of preparing the SiAlON phosphor may include a washing process to remove impurities on a surface of the phosphor. Acids, such as HF, $HNO_3$, HCl and $H_2SO_4$ and bases, such as NaOH, $NH_4OH$ and KOH, may be used for washing the phosphor.

A method of mixing the strontium precursor, the silicon precursor, the aluminum precursor, and the activator precursor after measurement may be one of dry mixing and wet mixing.

First, according to a wet mixing method, the strontium precursor, the silicon precursor, the aluminum precursor, and the activator precursor, which are measured, balls to aid in mixing and grinding the precursors, and a solvent were mixed. Here, the balls may be silicon oxide ($SiO_2$), alumina ($Al_2O_3$) or zirconia ($ZrO_2$) balls, or balls generally used for mixing ingredients. The solvent may be deionized (DI) water, alcohols, such as ethanol, or organic solvents, such as n-hexane.

That is, after putting the precursors, the solvent, and the balls in a container, the container is sealed, followed by homogenous mixing for about 0.1 to 100 hours using a miller or the like. When mixing is completed, the mixture is separated from the balls and dried in an oven for about 1 to 30 hours to evaporate the solvent mostly. Then, the dried powder is uniformly ground using a micrometer-sized sieve of metal or polymer.

Meanwhile, according to a dry mixing method, the precursors are put in a container without a solvent and homogenously mixed using a milling machine. Mixing is carried out for about 0.1 to 1 hour, in which the balls may be added along with the precursors for ease of mixing, thereby reducing a mixing time.

The dry mixing method may reduce a total process time as compared with the wet mixing method since a drying process of a solvent is not involved. After the precursors are mixed, the resulting powder may be uniformly ground using a desired micrometer-sized sieve of metal or polymer in the same manner as in the wet mixing method.

Methods of preparing a phosphor according to other exemplary embodiments of the present invention are similar to the method of preparing the SiAlON phosphor represented by Formula 1. To avoid redundancy, the phosphor represented by Formula 2 will be mentioned regarding aluminum and barium amounts, and the phosphor represented by Formula 3 will be mentioned regarding addition of $Al_2O_3$ and adjustment of oxygen concentration.

A method of preparing a SiAlON phosphor according to another exemplary embodiment of the present invention includes generating a mixture by mixing a strontium precursor, a barium precursor, a silicon precursor, an aluminum precursor, and an activator precursor, and sintering the mixture under a nitrogen atmosphere, and a resulting phosphor is represented by Formula 2:

$$Sr_yBa_mSi_{(6-z)}Al_zO_zN_{(8-z)}:Re_x, \quad \text{[Formula 2]}$$

where $0.005 \leq x \leq 0.05$, $0.05 \leq y \leq 0.5$, $0.50 \leq z \leq 1.0$, $0.003 \leq m \leq 0.125$, and Re is a rare-earth element.

The barium precursor may be $BaCO_3$. Barium concentration is 0.003 mol to 0.125 mol, preferably 0.01 mol to 0.125 mol. Like strontium, barium never affects the crystal structure of the host matrix and enables the SiAlON phosphor to exhibit a short peak emission wavelength ranging from 525 nm to 537 nm.

A method of preparing a SiAlON phosphor according to still another exemplary embodiment of the present invention includes generating a mixture by mixing a strontium precursor, a silicon precursor, an aluminum precursor, and an activator precursor, and sintering the mixture under a nitrogen atmosphere, and a resulting phosphor is represented by Formula 3:

$$Sr_ySi_{(6-z)}Al_zO_zN_{(8-z)}:Re_x, \quad \text{[Formula 3]}$$

where $0.005 \leq x \leq 0.05$, $0.05 \leq y \leq 0.5$, $0.50 \leq z \leq 1.0$, and Re is a rare-earth element.

Aluminum nitride (AlN) or aluminum oxide ($Al_2O_3$) may be added as an aluminum precursor to adjust oxygen concentration, and aluminum and oxygen concentrations may be 0.58 mol to 0.75 mol. Accordingly, the SiAlON phosphor may emit light at a short peak emission wavelength ranging from 525 nm to 537 nm.

Ultimately, when aluminum concentration is high, for example, 0.50 mol to 1.0 mol, addition of barium or addition of not only AlN but also $Al_2O_3$ as an aluminum precursor enables the SiAlON phosphor to emit light at a short wavelength. Thus, the SiAlON phosphor may emit light at a short wavelength ranging from 525 nm to 537 nm, thereby preventing a decrease in color reproducibility and CRI.

Hereinafter, the present invention will be explained with reference to the following examples. These examples are provided for illustrative purposes only and are not to be in any way construed as limiting the present invention.

In the following examples, amounts of used raw materials are expressed based on a total mass of 1 g for a mixture including the raw materials. Mol % of each element according to amount of each raw material used in the examples corresponds to a number of moles of each element. That is, in a phosphor prepared using the raw materials, a number of moles of each element corresponds to mol % of each raw material.

Example 1

Silicon nitride ($Si_3N_4$) was used as a silicon precursor, and aluminum nitride (AlN) was used as an aluminum precursor. Further, europium oxide ($Eu_2O_3$) was used as an activator. $SrCO_3$ was used as a strontium precursor.

Based on a mixture having a total weight of 1 g, 0.050 g of $SrCO_3$, 0.885 g of $Si_3N_4$, 0.042 g of AlN, and 0.024 g of $Eu_2O_3$ were mixed using a mixer and a sieve and tamped into a BN crucible, which was set in a pressure-resistant electric furnace. For sintering, the electric furnace was heated to 500° C. in a vacuum state and supplied with an $N_2$ gas at 500° C.

The mixture was sintered at 2,050° C. for 5 hours in an $N_2$ gas atmosphere by elevating temperature at 10° C./min from 500° C. to 2,050° C. and maintaining a gas pressure of 1 MPa or higher. Then, the mixture was cooled, and the crucible was taken out of the electric furnace. The resulting SiAlON phosphor was ground and subjected to a 100-mesh sieve.

Example 2

A SiAlON phosphor was prepared in the same manner as in Example 1 except that 0.140 g of $SrCO_3$, 0.799 g of $Si_3N_4$, 0.039 g of AlN, and 0.022 g of $Eu_2O_3$ were used.

Example 3

A SiAlON phosphor was prepared in the same manner as in Example 1 except that 0.219 g of $SrCO_3$, 0.723 g of $Si_3N_4$, 0.037 g of AlN, and 0.021 g of $Eu_2O_3$ were used.

Comparative Example 1

A SiAlON phosphor was prepared in the same manner as in Example 1 except that 0.932 g of $Si_3N_4$, 0.043 g of AlN, and 0.025 g of $Eu_2O_3$ were used.

Example 4

A SiAlON phosphor was prepared in the same manner as in Example 1 except that 0.050 g of $SrCO_3$, 0.828 g of $Si_3N_4$, 0.098 g of AlN, and 0.024 g of $Eu_2O_3$ were used.

Example 5

A SiAlON phosphor was prepared in the same manner as in Example 1 except that 0.141 g of $SrCO_3$, 0.745 g of $Si_3N_4$, 0.091 g of AlN, and 0.022 g of $Eu_2O_3$ were used.

Example 6

A SiAlON phosphor was prepared in the same manner as in Example 1 except that 0.221 g of $SrCO_3$, 0.672 g of $Si_3N_4$, 0.086 g of AlN, and 0.021 g of $Eu_2O_3$ were used.

Comparative Example 2

A SiAlON phosphor was prepared in the same manner as in Example 1 except that 0.874 g of $Si_3N_4$, 0.101 g of AlN, and 0.025 g of $Eu_2O_3$ were used.

The phosphors according to Examples 1 to 3 and Comparative Example 1 have 2.14 mol % of aluminum, while the phosphors according to Examples 4 to 6 and Comparative Example 2 have 5.00 mol % of aluminum concentration.

Mass of each raw material is expressed based on a total mass of 1 g for a mixture including raw materials. Compositions of raw materials used in Examples 1 to 6 and Comparative Examples 1 and 2 are illustrated in Table 1, and mol % of each element is illustrated in Table 2.

TABLE 1

Compositions of raw materials used in Examples 1 to 6 and Comparative Examples 1 and 2

| Example No. | $SrCO_3$ (g) | $Si_3N_4$ (g) | AlN (g) | $Eu_2O_3$ (g) | Al (mol %) |
|---|---|---|---|---|---|
| Example 1 | 0.050 | 0.885 | 0.042 | 0.024 | 2.14 |
| Example 2 | 0.140 | 0.799 | 0.039 | 0.022 | 2.14 |
| Example 3 | 0.219 | 0.723 | 0.037 | 0.021 | 2.14 |
| Comparative Example 1 | 0.000 | 0.932 | 0.043 | 0.025 | 2.14 |
| Example 4 | 0.050 | 0.828 | 0.098 | 0.024 | 5.00 |
| Example 5 | 0.141 | 0.745 | 0.091 | 0.022 | 5.00 |
| Example 6 | 0.221 | 0.672 | 0.086 | 0.021 | 5.00 |
| Comparative Example 2 | 0.000 | 0.874 | 0.101 | 0.025 | 5.00 |

TABLE 2

Mol % of each element in Examples 1 to 6 and Comparative Examples 1 and 2

| Example No. | Sr (mol %) | Al (mol %) | Si (mol %) | Eu (mol %) |
|---|---|---|---|---|
| Example 1 | 0.71 | 2.14 | 40.000 | 0.29 |
| Example 2 | 2.14 | 2.14 | 38.571 | 0.29 |
| Example 3 | 3.57 | 2.14 | 37.143 | 0.29 |
| Comparative Example 1 | 0.00 | 2.14 | 40.714 | 0.29 |
| Example 4 | 0.71 | 5.00 | 37.143 | 0.29 |
| Example 5 | 2.14 | 5.00 | 35.710 | 0.29 |
| Example 6 | 3.57 | 5.00 | 34.290 | 0.29 |
| Comparative Example 2 | 0.00 | 5.00 | 37.857 | 0.29 |

The phosphor prepared in Example 1 is analyzed by powder X-ray diffraction (XRD), and analysis results are shown in FIG. 1. The prepared phosphor is identified as a β-SiAlON phosphor with reference to FIG. 1 and Joint Committee on Powder Diffraction Standards (JCPDS) data.

Figure 2:
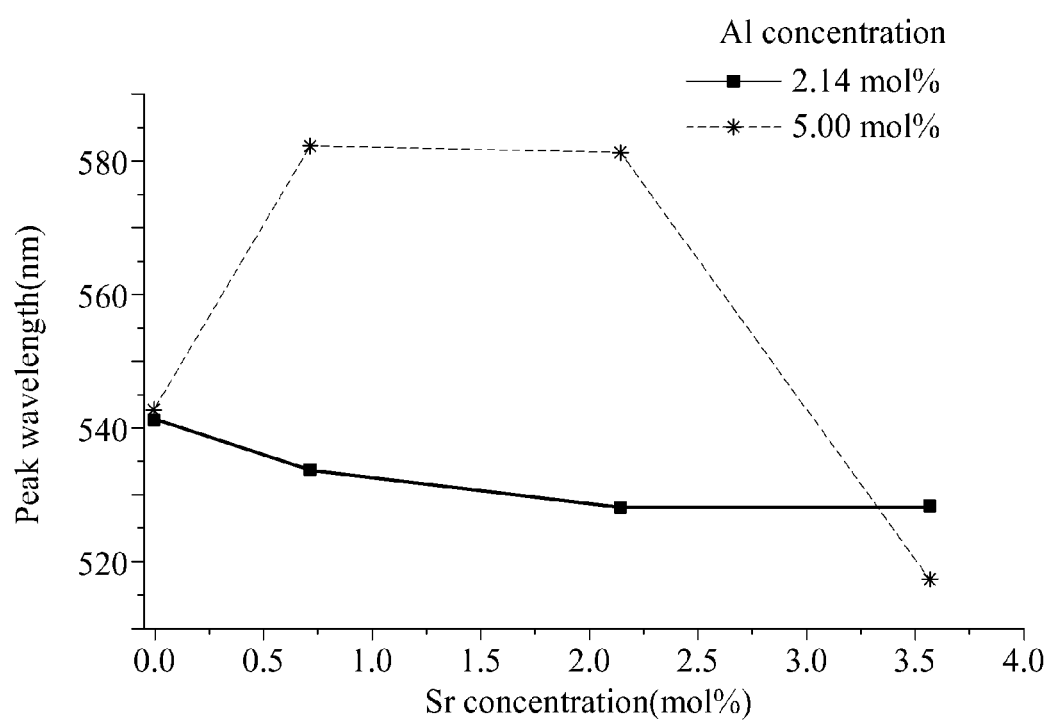
FIG. 2 is a graph illustrating peak emission wavelengths of SiAlON phosphors according to Examples 1 to 6 and Comparative Examples 1 and 2.

Referring to FIG. 2 and Table 2, when aluminum is 2.14 mol % and strontium is 0.35 mol % to 3.6 mol %, the phosphors have short peak emission wavelengths of 540 nm or lower. The phosphors prepared in Examples 1 to 3 are identified to have short peak emission wavelengths of 525 nm to 537 nm.

On the other hand, when aluminum is 5 mol % and strontium is 0.35 mol % to 3.6 mol %, the phosphors have peak emission wavelengths which is high up to about 580 nm at low mol % of strontium, while the phosphors have short peak emission wavelengths of 540 nm or lower at high mol % of strontium.

When aluminum is low, for example, 2.14 mol %, the phosphors have short peak emission wavelengths at a mol % of strontium ranging 0.35 mol % to 3.6 mol %. When aluminum is high, for example, 5.00 mol %, peak emission wavelengths of the phosphors may be rendered short by increasing mol % of strontium, adding barium as mentioned below, or adding AlN and $Al_2O_3$ maintaining total mol % of aluminum.

Example 7

A SiAlON phosphor was prepared in the same manner as in Example 1 except that 0.009 g of $BaCO_3$, 0.134 g of $SrCO_3$, 0.743 g of $Si_3N_4$, 0.091 g of AlN, and 0.022 g of $Eu_2O_3$ were used.

Example 8

A SiAlON phosphor was prepared in the same manner as in Example 1 except that 0.019 g of $BaCO_3$, 0.126 g of $SrCO_3$, 0.741 g of $Si_3N_4$, 0.091 g of AlN, and 0.022 g of $Eu_2O_3$ were used.

Example 9

A SiAlON phosphor was prepared in the same manner as in Example 1 except that 0.037 g of $BaCO_3$, 0.112 g of $SrCO_3$, 0.738 g of $Si_3N_4$, 0.091 g of AlN, and 0.022 g of $Eu_2O_3$ were used.

Comparative Example 3

A SiAlON phosphor was prepared in the same manner as in Example 1 except that 0.141 g of $SrCO_3$, 0.745 g of $Si_3N_4$, 0.091 g of AlN, and 0.022 g of $Eu_2O_3$ were used.

The phosphors according to Examples 7 to 9 and Comparative Example 3 have 5.00 mol % of aluminum. Mass of each raw material is expressed based on a total mass of 1 g for a mixture including raw materials. Compositions of raw materials used in Examples 7 to 9 and Comparative Example 3 are illustrated in Table 3, and mol % of each element is illustrated in Table 4.

TABLE 3

Compositions of raw materials used in Examples 7 to 9 and Comparative Example 3

| Example No. | $BaCO_3$ (g) | $SrCO_3$ (g) | $Si_3N_4$ (g) | AlN (g) | $Eu_2O_3$ (g) |
| --- | --- | --- | --- | --- | --- |
| Example 7 | 0.009 | 0.134 | 0.743 | 0.091 | 0.022 |
| Example 8 | 0.019 | 0.126 | 0.741 | 0.091 | 0.022 |
| Example 9 | 0.037 | 0.112 | 0.738 | 0.091 | 0.022 |
| Comparative Example 3 | 0.000 | 0.141 | 0.745 | 0.091 | 0.022 |

TABLE 4

Mol % of each element in Examples 7 to 9 and Comparative Example 3

| Example No. | Sr (mol %) | Ba (mol %) | Al (mol %) | Si (mol %) | Eu (mol %) |
| --- | --- | --- | --- | --- | --- |
| Example 7 | 2.033 | 0.107 | 5.00 | 35.714 | 0.29 |
| Example 8 | 1.926 | 0.214 | 5.00 | 35.714 | 0.29 |
| Example 9 | 1.711 | 0.429 | 5.00 | 35.714 | 0.29 |
| Comparative Example 3 | 2.14 | 0.000 | 5.00 | 35.714 | 0.29 |

Figure 3:
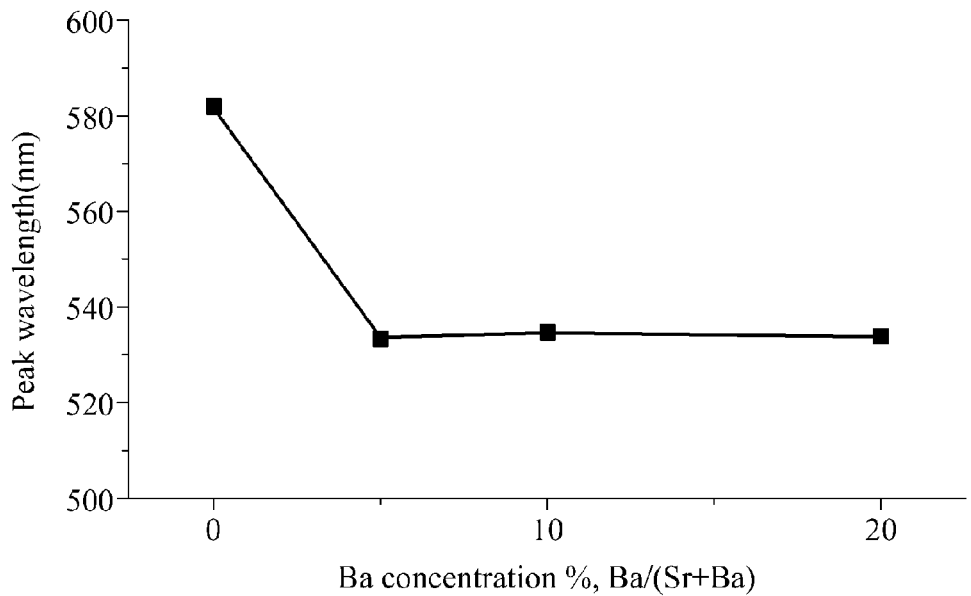
FIG. 3 is a graph illustrating peak emission wavelengths of SiAlON phosphors according to Examples 7 to 9 and Comparative Example 3.

Referring to FIG. 3 and Table 4, when aluminum is 5 mol % and strontium and barium are 2.14 mol % in total, the phosphors prepared in Examples 7 to 9 exhibit short peak emission wavelengths by increasing mol % of barium. Here, barium is 0.35 mol % to 1.5 mol %. Particularly, when barium content with respect to total mol % of strontium and barium is 5% to 20%, the phosphors exhibit short peak emission wavelengths.

Thus, even when strontium content is low and aluminum is 5.00 mol %, peak emission wavelengths of the phosphors may be rendered short at a barium content of 5% to 20% with respect to the total mol % of strontium and barium.

Example 10

A SiAlON phosphor was prepared in the same manner as in Example 1 except that 0.140 g of $SrCO_3$, 0.740 g of $Si_3N_4$, 0.086 g of AlN, 0.011 g of $Al_2O_3$, and 0.022 g of $Eu_2O_3$ were used.

Example 11

A SiAlON phosphor was prepared in the same manner as in Example 1 except that 0.139 g of $SrCO_3$, 0.735 g of $Si_3N_4$, 0.081 g of AlN, 0.022 g of $Al_2O_3$, and 0.022 g of $Eu_2O_3$ were used.

Example 12

A SiAlON phosphor was prepared in the same manner as in Example 1 except that 0.137 g of $SrCO_3$, 0.725 g of $Si_3N_4$, 0.071 g of AlN, 0.044 g of $Al_2O_3$, and 0.022 g of $Eu_2O_3$ were used.

Comparative Example 4

A SiAlON phosphor was prepared in the same manner as in Example 1 except that 0.141 g of $SrCO_3$, 0.745 g of $Si_3N_4$, 0.091 g of AlN, and 0.022 g of $Eu_2O_3$ were used.

The phosphors according to Examples 10 to 12 and Comparative Example 4 have 5.00 mol % of aluminum and 2.14 mol % of strontium. Mass of each raw material is expressed based on a total mass of 1 g for a mixture including raw materials. Compositions of raw materials used in Examples 10 to 12 and Comparative Example 4 are illustrated in Table 5, and mol % of each element is illustrated in Table 6.

TABLE 5

Compositions of raw materials used in Examples 10 to 12 and Comparative Example 4

| Example No. | $SrCO_3$ (g) | $Si_3N_4$ (g) | AlN (g) | $Al_2O_3$ (g) | $Eu_2O_3$ (g) |
| --- | --- | --- | --- | --- | --- |
| Example 10 | 0.140 | 0.740 | 0.086 | 0.011 | 0.022 |
| Example 11 | 0.139 | 0.735 | 0.081 | 0.022 | 0.022 |

TABLE 5-continued

Compositions of raw materials used in Examples 10 to 12 and Comparative Example 4

| Example No. | $SrCO_3$ (g) | $Si_3N_4$ (g) | AlN (g) | $Al_2O_3$ (g) | $Eu_2O_3$ (g) |
|---|---|---|---|---|---|
| Example 12 | 0.137 | 0.725 | 0.071 | 0.044 | 0.022 |
| Comparative Example 4 | 0.141 | 0.745 | 0.091 | 0.000 | 0.022 |

TABLE 6

Mol % of each element in Examples 10 to 12 and Comparative Example 4

| Example No. | Sr (mol %) | Al (mol %) | Si (mol %) | Eu (mol %) | $Al_2O_3$ (%) |
|---|---|---|---|---|---|
| Example 10 | 2.14 | 5.00 | 35.71 | 0.29 | 5 |
| Example 11 | 2.14 | 5.00 | 35.71 | 0.29 | 10 |
| Example 12 | 2.14 | 5.00 | 35.71 | 0.29 | 20 |
| Comparative Example 4 | 2.14 | 5.00 | 35.71 | 0.29 | 0 |

Figure 4:
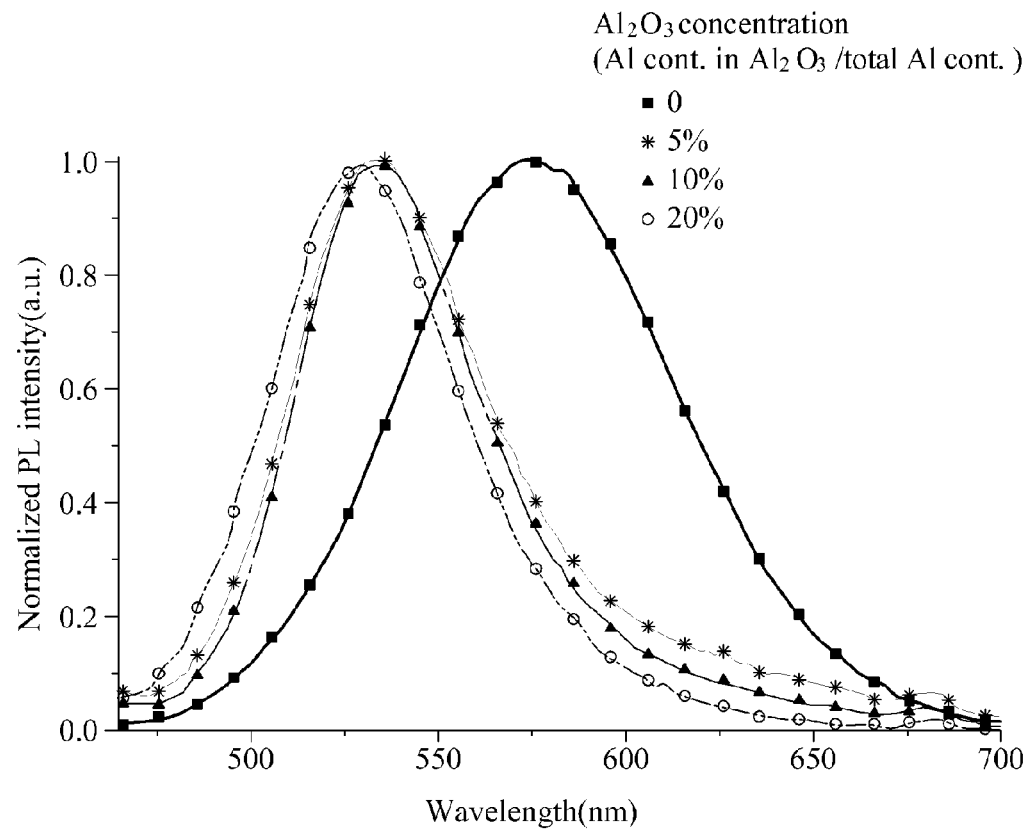
FIG. 4 is a graph illustrating normalized photoluminescence (PL) intensities of SiAlON phosphors prepared in Examples 10 to 12 and Comparative Example 4 according to wavelengths thereof.

Referring to FIG. 4 and Table 6, when aluminum is 5 mol % and strontium and barium are 2.14 mol % in total, the phosphors prepared in Examples 10 to 12 exhibit short peak emission wavelengths with an increase in $Al_2O_3$ content (%). That is, as the $Al_2O_3$ content increases, oxygen (O) content increases and the phosphors having high $Al_2O_3$ content (%) exhibit short peak emission wavelengths.

Thus, even when strontium content is low and aluminum is 5.00 mol %, peak emission wavelengths of the phosphors with added AlN and $Al_2O_3$ may be rendered short, maintaining total mol % of aluminum.

Although the present invention has been shown and described with reference to a few exemplary embodiments, these embodiments are provided for illustrative purposes only and are not to be in any way construed as limiting the present invention. Instead, it would be appreciated by those skilled in the art that changes and modifications may be made to these embodiments without departing from the principles and spirit of the invention, the scope of which is defined by the claims and their equivalents. For example, components or elements described in detail in the embodiments may be changed or modified. Further, it should be noted that differences of such modifications and applications fall within the scope of the present invention defined by the claims and their equivalents.

The invention claimed is:

1. A phosphor being represented by Formula 1:

$$Sr_ySi_{(6-z)}Al_zO_zN_{(8-z)}:Re_x,$$ [Formula 1]

where $0.005 \leq x \leq 0.05$, $0.05 \leq y \leq 0.5$, $0.001 \leq z \leq 0.50$, and Re is a rare-earth element.

2. The phosphor of claim 1, wherein z is 0.10 to 0.35.

3. The phosphor of claim 1, wherein the phosphor has a peak emission wavelength ranging from 525 nm to 537 nm when irradiated by an excitation source.

4. The phosphor of claim 1, wherein the rare-earth element is selected from the group consisting of Eu and Ce.

5. A phosphor being represented by Formula 2:

$$Sr_yBa_mSi_{(6-z)}Al_zO_zN_{(8-z)}:Re_x,$$ [Formula 2]

where $0.005 \leq x \leq 0.05$, $0.05 \leq y \leq 0.5$, $0.50 \leq z \leq 1.0$, $0.003 \leq m \leq 0.125$, and Re is a rare-earth element.

6. The phosphor of claim 5, wherein m satisfies $0.01 \leq m \leq 0.125$.

7. The phosphor of claim 5, wherein the phosphor has a peak emission wavelength ranging from 525 nm to 537 nm when irradiated by an excitation source.

8. A phosphor being represented by Formula 3:

$$Sr_ySi_{(6-z)}Al_zO_zN_{(8-z)}:Re_x,$$ [Formula 3]

where $0.005 \leq x \leq 0.05$, $0.05 \leq y \leq 0.5$, $0.50 \leq z \leq 1.0$, and Re is a rare-earth element.

9. The phosphor of claim 8, wherein z satisfies $0.58 \leq z \leq 0.75$.

10. The phosphor of claim 8, wherein the phosphor has a peak emission wavelength ranging from 525 nm to 537 nm when irradiated by an excitation source.

11. A method of preparing a phosphor, the method comprising:
generating a mixture by mixing a strontium precursor, a silicon precursor, an aluminum precursor, and an activator precursor; and
sintering the mixture under a nitrogen atmosphere,
the phosphor being represented by Formula 1:

$$Sr_ySi_{(6-z)}Al_zO_zN_{(8-z)}:Re_x,$$ [Formula 1]

where $0.005 \leq x \leq 0.05$, $0.05 \leq y \leq 0.5$, $0.001 \leq z \leq 0.50$, and Re is a rare-earth element.

12. The method of claim 11, wherein the strontium precursor is $SrCO_3$.

13. The method of claim 11, wherein the aluminum precursor is selected from the group consisting of metallic aluminum and aluminum nitride.

14. The method of claim 11, wherein the activator precursor is a compound comprising a rare-earth element.

15. The method of claim 14, wherein the rare-earth element is selected from the group consisting of Eu and Ce.

16. The method of claim 11, wherein the sintering is carried out at 1,800° C. to 2,200° C.

17. The method of claim 11, wherein the sintering is carried out at a pressure of nitrogen gas of 0.1 MPa to 10 MPa.

18. A method of preparing a phosphor, the method comprising:
generating a mixture by mixing a strontium precursor, a barium precursor, a silicon precursor, an aluminum precursor, and an activator precursor; and
sintering the mixture under a nitrogen atmosphere,
the phosphor being represented by Formula 2:

$$Sr_yBa_mSi_{(6-z)}Al_zO_zN_{(8-z)}:Re_x,$$ [Formula 2]

where $0.005 \leq x \leq 0.05$, $0.05 \leq y \leq 0.5$, $0.50 \leq z \leq 1.0$, $0.003 \leq m \leq 0.125$, and Re is a rare-earth element.

19. The method of claim 18, wherein the barium precursor is $BaCO_3$.

20. A method of preparing a phosphor, the method comprising:
generating a mixture by mixing a strontium precursor, a silicon precursor, an aluminum precursor, and an activator precursor; and
sintering the mixture under a nitrogen atmosphere,
the phosphor being represented by Formula 3:

$$Sr_ySi_{(6-z)}Al_zO_zN_{(8-z)}:Re_x,$$ [Formula 3]

where $0.005 \leq x \leq 0.05$, $0.05 \leq y \leq 0.5$, $0.50 \leq z \leq 1.0$, and Re is a rare-earth element.

21. The method of claim 20, wherein the aluminum precursor is aluminum nitride and aluminum oxide.

* * * * *